United States Patent
Soerensen

(10) Patent No.: US 9,164,120 B2
(45) Date of Patent: Oct. 20, 2015

(54) METHOD OF AND DEVICE FOR CAPTURING 3D DATA OF ONE OR MORE AIRBORNE PARTICLES

(75) Inventor: Emil Hedevang Lohse Soerensen, Århus C (DK)

(73) Assignee: SEIMENS AKTIENGESELLSCHAFT, München (DE)

( * ) Notice: Subject to any disclaimer, the term of this patent is extended or adjusted under 35 U.S.C. 154(b) by 624 days.

(21) Appl. No.: 13/532,892

(22) Filed: Jun. 26, 2012

(65) Prior Publication Data

US 2013/0002829 A1 Jan. 3, 2013

(30) Foreign Application Priority Data

Jun. 30, 2011 (EP) ..................................... 11172225

(51) Int. Cl.
*G01P 5/26* (2006.01)
*G01P 5/00* (2006.01)
*G01S 5/16* (2006.01)

(52) U.S. Cl.
CPC . *G01P 5/26* (2013.01); *G01P 5/001* (2013.01); *G01S 5/16* (2013.01)

(58) Field of Classification Search
CPC .......... G03B 41/00; G06K 9/40; G01P 5/001; G01P 5/26; G01S 5/16
USPC ........... 382/103, 106, 275, 276; 348/134, 135
See application file for complete search history.

(56) References Cited

U.S. PATENT DOCUMENTS

| | | | |
|---|---|---|---|
| 5,434,570 A * | 7/1995 | Wurman | 342/26 D |
| 5,623,267 A * | 4/1997 | Wurman | 342/26 D |
| 6,348,687 B1 * | 2/2002 | Brockmann et al. | 250/251 |
| 6,542,226 B1 | 4/2003 | Wernet | |
| 7,425,774 B2 * | 9/2008 | Shibata et al. | 290/55 |
| 7,949,252 B1 * | 5/2011 | Georgiev | 396/334 |
| 8,809,771 B2 * | 8/2014 | Syrstad | 250/282 |
| 2005/0200134 A1 * | 9/2005 | Shibata et al. | 290/55 |
| 2006/0140764 A1 | 6/2006 | Harris | |
| 2007/0122056 A1 * | 5/2007 | Steinberg et al. | 382/275 |
| 2008/0291220 A1 * | 11/2008 | Cheng et al. | 345/632 |

(Continued)

FOREIGN PATENT DOCUMENTS

| | | |
|---|---|---|
| EP | 1172712 A1 | 1/2002 |
| EP | 2133562 A2 | 12/2009 |

(Continued)

OTHER PUBLICATIONS

Todor Georgiev, Using Focused Plenoptic Cameras for Rich Image Capture, Jan./ Feb. 2011, Published by the IEEE Computer Society, Indiana University.*

(Continued)

*Primary Examiner* — Sath V Perungavoor
*Assistant Examiner* — Amadihe Kennon

(57) ABSTRACT

Disclosed is a method of capturing 3D data of one or more airborne. At least one image of the one or more airborne particles is taken by a plenoptic camera of which the geometry and the optical properties of its optics are known, and the distance of a plane of focus with at least one selected particle of the one or more airborne particles from a defined reference location is determined by use of the captured image together with the known optical properties and the known geometry of the optics of the plenoptic camera.

9 Claims, 3 Drawing Sheets

(56) References Cited

U.S. PATENT DOCUMENTS

2010/0312594 A1* 12/2010 Andersen et al. .................. 705/7
2012/0105628 A1* 5/2012 Fukuchi et al. ............... 348/135

FOREIGN PATENT DOCUMENTS

| EP | 2239706 A1 | 10/2010 |
| GB | 2398841 A | 9/2004 |

OTHER PUBLICATIONS

Edward H. Adelson and John Y.A. Wang, Single Lens Stereo with a Plenoptic Camera, Feb. 1992, vol. 14, No. 2.*

E. H. Adelson, J. Y. A. Wang: "Single Lens Stereo with a Plenoptic Camera", IEEE Transactions on Pattern Analysis and Machine Intelligence, IEEE Service Center, vol. 14, No. 2, pp. 99-106, XP000248474, Feb. 1, 1992; Others; 1992.

* cited by examiner

METHOD OF AND DEVICE FOR CAPTURING 3D DATA OF ONE OR MORE AIRBORNE PARTICLES

CROSS REFERENCE TO RELATED APPLICATIONS

This application claims priority of European Patent Office application No. 11172225.2 EP filed Jun. 30, 2011. All of the applications are incorporated by reference herein in their entirety.

FIELD OF INVENTION

The present disclosure relates to a method of capturing 3D data of one or more airborne particles. In addition, the disclosure relates to a device for performing the method.

BACKGROUND OF INVENTION

Capturing large scale or small scale 3D wind data is, for example, of importance for validating aerodynamic properties of models in wind tunnels or other articles. In addition, 3D wind data may be used in control systems of wind turbines to optimize wind turbine efficiency or to take measures for counteracting expected loads.

US 2006/0140764 A1 describes a wind turbine having a LIDAR (light detection and ranging) wind speed measurement apparatus for achieving wind control. LIDAR is most commonly used to capture wind speed and direction data, but it is limited to either points on a line or, with newer versions, a two-dimensional plane. Hence, in order to capture 3D data within a volume it is necessary to scan the volume with the lidar apparatus.

SUMMARY OF INVENTION

It is an objective to provide a method of capturing 3D data of one or more airborne particles. It is a further objective to provide a device for capturing 3D data of one or more airborne particles.

In the disclosed method of capturing 3D data of one or more airborne particles at least one image of the one or more airborne particles, which may be natural particles like dust particles or water droplets or intentionally introduced tracer particles, is taken by a plenoptic camera of which the geometry and the optical parameters of the camera optics are known. By use of the captured image together with the known geometry and optical properties of the optics of the plenoptic camera the distance of a plane of focus with at least one selected particle of the one or more airborne particles from a defined reference location, e.g. from the plane of the image sensor of the camera, is determined.

In an image taken by a plenoptic camera the particles located within the plane of focus will appear sharp while those particles that are located behind or in front of the plane of focus will appear blurry and out of focus. Moreover, in a picture taken by a plenoptic camera light field information about the scene captured by the camera is included. Such light field information may be used to refocus the captured image by post-processing. In other words, the image contains light field information which allows to move the plane of focus back and forth by post-processing of the image. In case the optical properties and the geometry of the optics within the plenoptic camera are known one may determine the distance of the plane of focus that is set by post-processing from a reference location like, for example from the plane of the image sensor. Hence, by capturing a single image and by post-processing with moving the plane of focus back and forth one may determine the distance of airborne particles that are located in the respective plane of focus for a given volume in object space.

Moreover, if the distance of an airborne particle from a reference location, like the location of the image plane, is known one may translate the distance the respective particle has from the optical axis in the image into a distance of the real object from the extension of the optical axis in object space. Therefore, in a further embodiment of the method, not only the distance of the selected particle or particles from a defined reference location is determined but also the location of the selected particle or selected particles with respect to the optical axis within the plane of focus.

Successive images of one or more airborne particles may be taken by the plenoptic camera. Then, the successive distances of the plane of focus of the at least one selected particle of the one or more airborne particles from a defined reference location may be successively determined by use of the successively captured images together with the known geometry and optical properties of the optics of the plenoptic camera. In other words, the plenoptic camera may be used for capturing the motion of the one or more selected particles in a direction parallel to the optical axis of the camera optics. Moreover, successive locations of the at least one selected particle within the plane of focus may be determined by use of the successively captured images together with the known geometry and the known optical properties of the plenoptic camera. The informations about the successive locations parallel and perpendicular to the optical axis of the plenoptic camera optics may be used to determine a three-dimensional velocity vector field of the at least one selected particle. The three-dimensional velocity vector field may in turn be used to derive three-dimensional wind data. Such wind data may, for example, be used in evaluating aerodynamic properties of an article, for example a model in a wind tunnel, or may be processed in a control system of a wind turbine in order to optimize wind turbine efficiency or to reduce loads acting on the wind turbine.

In order to provide airborne particles the 3D data of which may be captured for deriving wind data, tracer particles may be seeded into the wind at or close to the location where the three-dimensional wind data is to be captured in order to form the airborne particles the three-dimensional velocity vector field of which is determined.

Disclosed is a device for capturing 3D data of one or more airborne particles comprises a plenoptic camera and a processing unit that is connected to the plenoptic camera and adapted to perform the method of capturing 3D data of one or more airborne particles. The device may further comprise a tracer particles ejection mechanism. However, in general, the device and/or method may be used with natural airborne particles, like dust particles, ice particles, water droplets, etc.

According to a further aspect, a wind energy installation, i.e. a single wind turbine or a wind farm comprising a number of wind turbines, is provided. The wind energy installation comprises one or more wind turbines and a device for capturing 3D data of one or more airborne particles. The device may be located at a wind turbine or at a support of its own. However, it would typically be located in proximity to one or more wind turbines.

The device for capturing 3D data of one or more airborne particles may be used in a control system of the wind energy installation to consider the three-dimensional wind field in order to optimize power output of the wind turbine, e.g. by adapting the pitch angle of the blades to the wind conditions derived from the determined wind field, or in order to reduce loads on the blades which may be due to wind shear or gusts of wind. Since the method, and hence the device, is able to determine wind field properties at a distance of the wind turbine these properties may be determined before the respective wind shear or gusts of wind or other wind conditions reach the wind turbine. As a consequence, measures like adapting the pitch angle of the rotor blades to optimize power output or to counteract a wind shear or gust of wind may have already been taken when the respective wind field reaches the wind turbine.

Moreover, the device may be used to monitor the aerodynamic properties of the rotor blades for example for given settings of pitch angles. Inter alia, but not exclusively, for simplifying such measurements the wind energy installation may comprise a rotor with one or more rotor blades, where at least one of the rotor blades is equipped with a tracer particles ejection mechanism. Such a tracer particles ejection mechanism could, for example, be located in the tip section of a rotor blade, in the trailing edge section of a rotor blade or it may be distributed over the whole rotor blade. Moreover, the tracer particles ejecting mechanism may comprise a number of tracer particles ejecting holes or nozzles that are distributed over at least a section of the rotor blade, i.e. for example the tip section, the trailing edge section or the whole blade.

According to a still further aspect, a wind tunnel is provided that comprises at least one device for capturing 3D data of one or more airborne particles. The use of the device in a wind tunnel provides that a whole wind field may be determined with a single camera.

BRIEF DESCRIPTION OF THE DRAWINGS

Further features and properties will become clear from the following description of embodiments in conjunction with the accompanying drawings.

DETAILED DESCRIPTION OF INVENTION

Prior to describing the method, the main optical components of a plenoptic camera will be described with respect to FIGS. 1 and 2.

Figure 1:
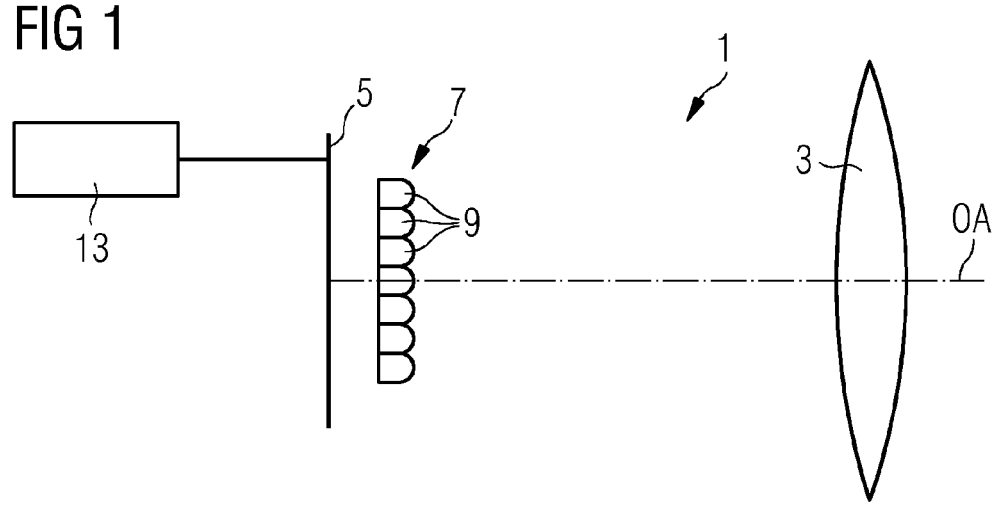
FIG. 1 shows the main optical elements of a plenoptic camera in a highly schematic sectional view taken along the optical axis of the optical components.
Figure 2:
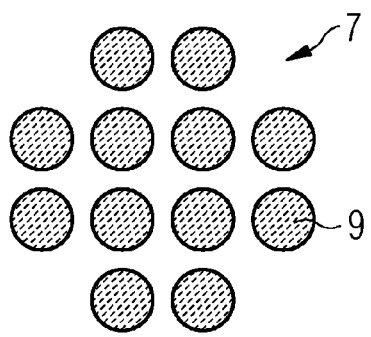
FIG. 2 shows a highly schematic view onto an array of microlenses as seen in a view along the optical axis.

FIG. 1 shows the arrangement of the main optical components of a plenoptic camera 1 in a section taken along the optical axis OA of the components. The plenoptic camera 1 comprises a main lens 3, an image sensor 5, which could be a CCD-sensor (CCD: charge coupled device) or a CMOS-sensor (CMOS: complementary metal oxide semiconductor), and a lenticular array 7, i.e. an array of microlenses 9, arranged in front of the image sensor 5. A view onto the lenticular array 7 in a direction along the optical axis OA is shown in FIG. 2.

One may think of each microlens 7 of the lenticular array as being a tiny camera that forms an image of the main lens aperture on the sensor 5. Since the mircolenses 9 of the lenticular array 7 are distributed in a plane perpendicular to the optical axis OA each tiny image formed by a microlens 9 represents a slightly different viewing angle onto the main lens aperture. Due to these different viewing angles, the image captured by the plenoptic camera 1 contains information on the distance of the imaged object from the image sensor 5. Since the geometrical and optical properties of the plenoptic camera optical components are known one may use this information not only to refocus the image but also to determine the distance of an object in focus from e.g. the image sensor 5. This will be used in the disclosed method. Detailed information on the structure of a plenoptic camera as well as information on the theory of image forming with a plenoptic camera is given by Edward H. Adelson and John Y. A. Wang in IEEE Transactions on Pattern Analysis and Machine Intelligence, Vol. 14, No. 2, February 1992. Therefore, both the structure of the camera and the theory of image forming are not explained in further detail in the present application.

Figure 3:
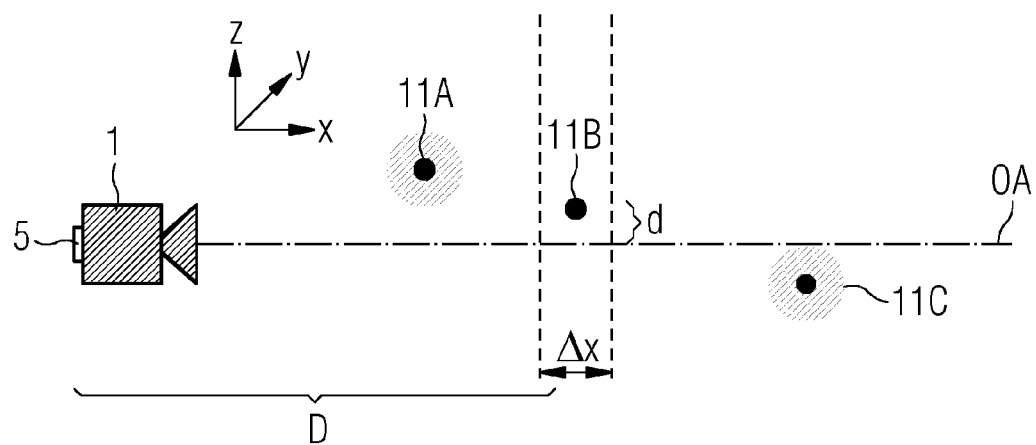
FIG. 3 shows an arrangement illustrating the method in a section along the optical axis.
Figure 4:
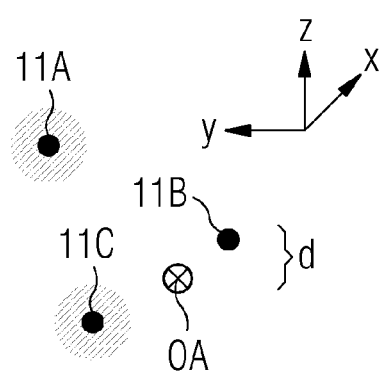
FIG. 4 shows the scene of FIG. 3 as seen from the plenoptic camera.

FIGS. 3 and 4 schematically show a scene for explaining the method. These Figures show a plenoptic camera 1 and three exemplary airborne particles 11A, 11B, 11C at the time an image is taken with the plenoptic camera 1. As can be seen from FIGS. 3 and 4 the locations of these particles 11A, 11B, 11C not only differ in the distance from the sensor plane but also in their distances from the optical axis OA.

As has been already mentioned, an image captured by a plenoptic camera offers the option to refocus an image by post-processing. In other words, by suitable graphical processing, which may, for example, be done by a graphics processing unit (GPU) 13 that receives the image data from the image sensor 5 (see FIG. 1), different two-dimensional images may be derived from the image data which differ in the distance of the plane of focus, i.e. the object plane the objects of which are imaged sharply on the sensor 5, from the sensor plane. If, for example, the plenoptic image is focused such that the object plane that is imaged sharply on the image sensor 5 contains particle 11B the distance of particle 11B from the image sensor 5 may be derived by calculating the distance of this object plane from the image sensor 5 by use the known geometrical and optical properties of the plenoptic camera optical elements. Moreover, once the distance of the particle from the image sensor 5 is known the distanced of the airborne particle 11B from the optical axis OA in object space may also calculated from the image. Hence, the three-dimensional coordinates of the airborne particle 11B may be calculated from the image captured by the plenoptic camera 1.

Up to now, the same information could, in principle, be derived with a conventional camera. However, as already mentioned, the plenoptic camera 1 allows to refocus the image so that it becomes possible to post-process the image such that the object plane that is imaged sharply moves to, for example, airborne particle 11A. From this post-processed image and the known optical and geometrical properties of the plenoptic camera optics now the three-dimensional coordinates of the airborne particle 11A may be derived. In the same manner, the three-dimensional coordinates of the airborne particle 11C may also be derived from the known optical and geometrical properties of the plenoptic camera optical elements after the image has been refocused again so that the object plane that is imaged sharply contains particle 11C.

Please note that the object plane which is focused in the image is not an infinitely thin plane but in fact a plane with a small thickness $\Delta x$. This is due to the fact that the pixels of the sensor 5 are not infinitely small so that a blurred image point that is not larger than a pixel cannot be distinguished from a truly sharp image point. However, all particles which are not within the volume defined by Δx will appear blurred on the image. Since the distance of the particles from the sensor 5 is typically larger than the thickness Δx of the object plane that is imaged sharply one may still think of an object plane instead of a thin volume.

If the plenoptic camera 1 successively captures images of the scene shown in FIGS. 3 and 4 one may determine the motion of the airborne particles 11A, 11B, 11C by post-processing the successive images and evaluating each image as described above. Then, it is possible to estimate a three-dimensional velocity vector for each particle 11A, 11B, 11C. In particular, by recording a movie at a high frame rate using a plenoptic camera methods like particle image velocimetry (PIV) may be applied to estimate the full three-dimensional velocity vector field. This would lead to a three-dimensional analogue to the conventional two-dimensional PIV.

The airborne particles 11A, 11B, 11C the 3D data of which is captured by the method described above may be particles that are naturally in the air, like e.g. dust or ice particles, or may be tracer particles that have been intentionally introduced into the air. For example, in a wind tunnel where the aerodynamics of an object like, for example, a model of a car or of a wind turbine airfoil is evaluated one may use the above method in conjunction with trace particles to estimate the whole three-dimensional velocity vector field in some region of interest.

The method may also be useful in a wind turbine installation to capture three-dimensional wind data which may then be used in a control system, for example to optimize power output of the wind turbine installation or to reduce loads acting on it. In the context of the present description, a wind turbine installation may either be a single wind turbine or a wind farm comprising a number of wind turbines. The wind energy installation may be equipped with a device for capturing 3D data of one or more airborne particles, i.e., with a plenoptic camera 1 imaging a wind field of interest and a processing unit 13 receiving the image captured by the plenoptic camera 1. The processing unit 13, which may be a graphics processing unit (GPU), is adapted to perform the disclosed method so as to allow to estimate three-dimensional velocity vector fields for airborne particles that are visible in the image. These airborne particles may, for example, be dust particles or may be intentionally introduced into the wind field of interest. For example, if a wind turbine is to be evaluated one could introduce tracer particles before the wind turbine which then will be carried along the wind turbine by the wind field. Introducing the tracer particles could, for example, be done by a helicopter or by use of a crane.

Moreover, a device for capturing 3D data could be permanently present in the wind turbine installation. For example, the plenoptic camera 1 could be located on a wind turbine nacelle or on a post located within a wind farm. The processing unit 13 could be integrated into a wind turbine controller or the wind farm controller. Alternatively, it would be possible to implement the processing unit as a device on its own that is connected with the control system of a wind turbine or the wind farm by a signal line.

Figure 5:
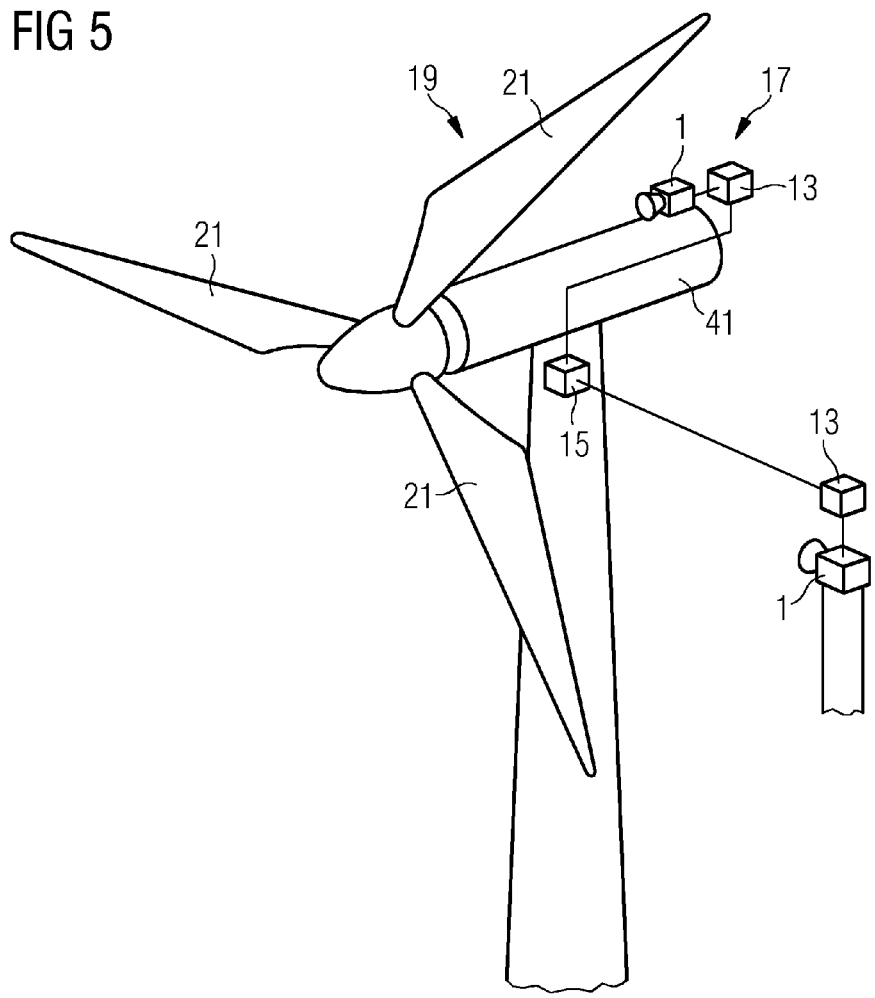
FIG. 5 schematically shows a wind turbine.

FIG. 5 shows a single wind turbine 17 as an example for a wind energy installation, where the processing unit 13 is connected to a wind turbine control system 15. The wind turbine is equipped with a rotor 19 carrying three rotor blades 21 that allow to eject tracer particles.

Figure 6:
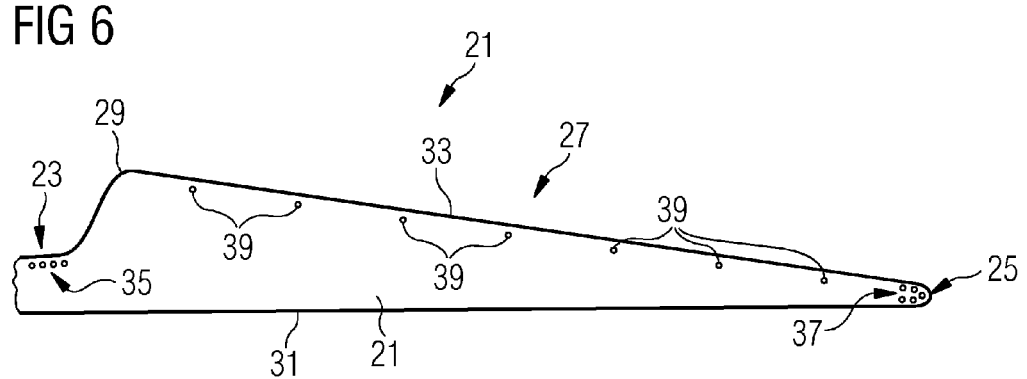
FIG. 6 schematically shows a wind turbine rotor blade with tracer particles ejection means.

FIG. 6 shows one of the wind turbine rotor blades 21 in more detail. The rotor blade 21 comprises a root section 23, a tip section 25 and an airfoil section 27 that extends from the tip section 25 towards the root section 23. The air foil section 27 increases in width from the tip section 25 towards the root section 23 and reaches its greatest width at a so-called shoulder 29 on which a transition section 30 follows until the root section 23 is reached. The airfoil section comprises a leading edge 31 that shows upwind and a trailing edge 33 that shows downwind.

One may like to measure the dynamic behavior of the wake of the rotor blade 21 or tip vorticies or root vorticies by seeding the wind with tracer particles. For this reason, a tracer particle ejecting mechanism or means with ejection holes 35 located in the root section 23 and/or with ejection holes 37 located in the tip section 25 may be present. Additionally, or alternatively, tracer particles ejecting means with ejection holes in other sections of the wind turbine rotor blade 21 may also present. In FIG. 6, ejection holes 39 distributed along the trailing edge 33 of the rotor blade are exemplary shown.

As tracer particles that are ejected through the ejection holes solid particles or liquid particles could be used. In case of liquid particles, the ejection holes could be implemented as atomizer nozzles. Moreover, it would be possible to color the solid or liquid particles in order to simplify identification in the image captured by the plenoptic camera 1.

Although the plenoptic camera 1 and the processing unit 13 are located at a separate post in FIG. 5 it is also possible to locate the plenoptic camera 1 together with the processing unit 13 for example at the nacelle of a wind turbine, as it is also shown in FIG. 5.

While specific embodiments have been described in detail, those with ordinary skill in the art will appreciate that various modifications and alternative to those details could be developed in light of the overall teachings of the disclosure. However, these embodiments are not meant to limit the scope of protection since modifications of these embodiments are possible. For example, the plenoptic camera 1 may be mounted on a remotely controllable stand so that the viewing angle of the camera may be set remotely by an operator. This allows for capturing images of different regions of interest by using a single camera. Moreover, although the processing unit 13 has been shown to be separate unit in FIG. 5 the processing unit could also be integrated into the wind turbine control system 15. In addition, if the wind turbine is part of a wind farm the processing unit could as well be integrated in a centralized control system like the wind farm control system. Moreover, with the already mentioned remotely controllable stand a single plenoptic camera could be used for determining three-dimensional velocity vector fields of tracer particles at different wind turbines. Hence, the particular arrangements disclosed are meant to be illustrative only and not limiting as to the scope of the invention, which is to be given the full breadth of the appended claims, and any and all equivalents thereof.

For the sake of clarity, it is to be understood that the use of "a" or "an" throughout this application does not exclude a plurality, and "comprising" does not exclude other steps or elements. A "unit" or "module" may comprise a number of units or modules, unless otherwise stated.

The invention claimed is:

1. A method of deriving three-dimensional wind data comprising:
    successively receiving images of one or more airborne particles, the images taken by a plenoptic camera of which the geometry and the optical properties of its optics are known;
    successively determining successive distances of a plane of focus with at least one selected particle of the one or more airborne particles from a defined reference location by use of the successively received images together with the known optical properties and the known geometry of the optics of the plenoptic camera;

determining successive locations of the at least one selected particle within the plane of focus by use of the successively received images together with the known optical properties and the known geometry of the optics of the plenoptic camera;

determining a three-dimensional velocity vector field of the at least one selected particle from the determined successive distances of the plane of focus and the determined successive locations; and using the three-dimensional velocity vector field to derive three-dimensional wind data.

2. The method as claimed in claim 1,
determining the location of the at least one selected particle within the plane of focus with respect to the optical axis of the camera optics.

3. The method as claimed in claim 1,
wherein tracer particles are seeded into the wind at or close to the location where the three-dimensional wind data is to be captured in order to form the airborne particles the three-dimensional velocity vector field of which is determined.

4. A device for deriving three-dimensional wind data comprising:
a plenoptic camera; and
a processing unit that is connected to the plenoptic camera and that is configured to perform the method of deriving three-dimensional wind data according to claim 1.

5. The device as claimed in claim 4, further comprising:
a tracer particles ejection mechanism.

6. A wind energy installation comprising:
at least one wind turbine and a device for deriving three-dimensional wind data as claimed in claim 4.

7. The wind energy installation as claimed in claim 6, wherein the at least one wind turbine includes a rotor with at least one rotor blade equipped with a tracer particles ejection mechanism.

8. The wind energy installation as claimed in claim 7, wherein the tracer particles ejection mechanism comprises a number of tracer particles ejection holes or nozzles distributed over at least a section of the rotor blade.

9. A wind tunnel comprising:
at least one device for deriving three-dimensional wind data as claimed in claim 4.

* * * * *